Dec. 6, 1949  S. GUARNASCHELLI  2,490,687
FLEXIBLE CONNECTION
Filed Sept. 18, 1947
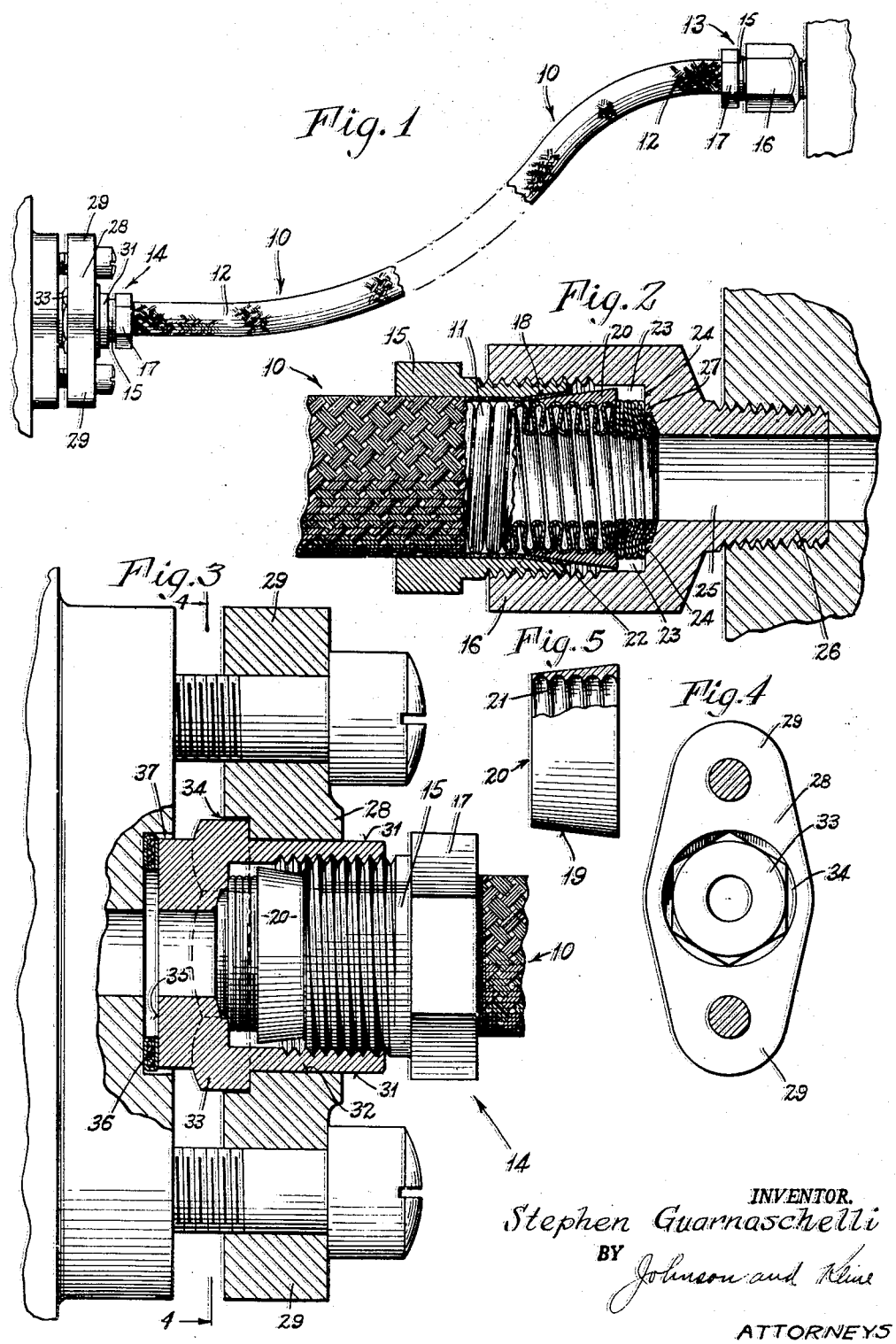
INVENTOR.
Stephen Guarnaschelli
BY
Johnson and Kline
ATTORNEYS Patented Dec. 6, 1949

2,490,687

UNITED STATES PATENT OFFICE 2,490,687

FLEXIBLE CONNECTION

Stephen Guarnaschelli, Naugatuck, Conn., assignor to The Brockway Company, Naugatuck, Conn., a corporation of Connecticut Application September 18, 1947, Serial No. 774,787

6 Claims. (Cl. 285—2)

This invention relates to means for connecting flexible metal hose to another conduit or to an orifice in a machine part.

It is the present practice when connecting high pressure steam, air or oil lines for instance to a moving member of a machine to use flexible metal armored hose having a threaded coupling at one end and a flange type connector at the other end by which it is fastened to the stationary and movable parts of the machine.

Heretofore one method of making a flange type connector for flexible metal hose was to provide a threaded socket in a flange and then a regular threaded coupling on the end of the hose which was screwed into the threaded socket in the flange. The flange had a boss or extension fitting into a socket in the frame of the machine and was drawn up tight against a gasket by two screws or bolts passing through holes in the flange into the machine frame.

With this arrangement the flange became permanently united with the hose and proved to be unsatisfactory in installation for if the end of the flexible metal hose opposite the flange type connector was fastened in such a way that the screw holes in the flange did not align with the threaded holes on the machine, the tendency was to twist the flange to bring them into alignment, keeping a constant rotary tension on the hose which ultimately caused it to fail.

In another method, the end of the hose was brazed to a collar to be permanently attached thereto, and this was rotatably mounted in the flange so that torsional strains in the hose could be avoided, but in brazing the hose to the flange it became annealed and weakened so that under constant flexing and vibrating of the hose breakage occurred at the point that was heated. Besides to facilitate brazing, the end of the collar had to be rather thin and could not form a tight seat against the machine part.

According to the present invention these difficulties are obviated by providing the flexible metal hose with a mechanically attachable and detachable coupling and a flange floatingly mounted on the coupling.

In the form of the invention illustrated, the coupling nests in the flange which may rotate on the coupling to align the mounting holes of the flange and the machine and consequently no rotary tension is applied to the flexible hose, no brazing of the coupling and hose is needed and the end of the coupling may be machined flat to a gasket carried in a recess in the machine, and thus only the coupling is interposed between the hose and the machine duct reducing the number of places where leaks may occur.

Other features and advantages will hereinafter appear.

In the accompanying drawings—

Figure 1 is a view in elevation of a flexible metal hose connecting stationary and moving members of a machine and having a flange type connector of the present invention.

Fig. 2 is an enlarged cross-section of the threaded mechanical coupling used at one end of the flexible hose.

Fig. 3 is an enlarged cross-sectional view partly in elevation of the flange type connector of the present invention.

Fig. 4 is an end view of the flange type connector taken on line 4—4 of Fig. 3; and Fig. 5 is a side view, partly in section, of the collar which is secured to the tubing of the hose.

As shown in the drawings, a length of flexible metal hose 10, comprised of helically corrugated metal tubing 11 and a braided wire sheath 12 is provided at its end with mechanical couplings 13 and 14. Each coupling comprises a connector for gripping and holding in leak-proof engagement with the coupling an end of the flexible metal hose. Such connector may for instance be constructed as shown in my co-pending application, Serial No. 738,064, filed March 29, 1947.

In the present disclosure, the couplings 13 and 14 each comprise an externally threaded male connector member 15 and an internally threaded female connector portion 16. The connector member 15 has a hexagonal nut 17 at one end, and is adapted to be slipped on the end of and encircle the flexible metal hose 10, and when screwed into the portion 16 clamps the end of the braided wire sheath 12 between the surface of a conical recess 18 at its leading end and a conforming conical surface 19 on a female collar 20, having helical corrugations 21 which are threaded on the end of the helical corrugated tubing 11 as shown in Fig. 2.

The connector portion 16 has an internally threaded bore 22 which is provided with an annular cavity 23 at the base of an interior annular abutment 24 and is concentric with a bore 25 for communicating with the passage of the flexible metal hose 10 when connected thereto.

In assembling each of the couplings 13 and 14 to its end of the flexible metal hose 10, the connector member 15 clamping the wire sheath 12 against the collar 20, is screwed into the female connector portion 16 to advance the flexible metal hose 10 and a portion of the tubing 11 extending outwardly from the ferrule 20 toward abutment 24 so that a sharp corner 27 of the cavity 23 bites into the collapsed convolutions of the end portion and forces the inner portions of the convolutions to expand into the cavity 23. The connector portion 16 of the coupling 13 has a threaded nipple 26 which may be screwed into a threaded hole in one part of the machine in which the flexible hose is used.

By this arrangement of a threaded mechanical coupling there is less possibility of breakage in the tubing due to flexing and vibrating as compared to a brazed fitting which anneals the tubing and causes it to rapidly fail at the connection.

In connecting a high pressure oil line, for instance, between a stationary and a movable part of a machine, it is the practice to have a threaded coupling and a flange type connector at opposite ends of a flexible metal hose whereby the threaded coupling is first screwed into a conduit or to an orifice in a machine and then the flange type connector is fastened against a gasket by screws passing through holes in the flange and engaging threaded holes in the machine. The difficulty heretofore experienced was that when the threaded coupling was screwed into the orifice of the machine the fastening holes of the flange type connector and the machine would not align, making it necessary to twist the flexible metal hose to bring the holes into alignment. This placed a constant rotary tension or torsion on the hose which caused it to develop cracks and breaks after repeated flexing by movement of the machine parts.

However, the difficulties above referred to have been obviated by the present invention by providing a new and improved flange type coupling wherein the flexible metal hose need not be twisted in making up the connection. This is done according to the present invention, as shown particularly in Fig. 3, by providing the coupling 14 with a flange 28 having a wing portion 29.

Instead of the flange being integral or rigid with the connector as heretofore, the flange 28 is rotatably carried by the connector member 16 and for this purpose the latter has a cylindrical external surface 31 (as distinguished from the hexagonal surface of the connector member 16 of the coupling 13) which fits a bore 32 in the flange 31, and an enlarged portion 33 fitting in a cylindrical recess 34 in the inner face of the flange 31. Even though the enlarged portion is hexagonal (so that it may be held in a vise or wrench when the connector member 15 is turned to grip and hold the flexible hose) the recess is large enough to permit the connector portion 16 and hose connected thereto to rotate, so that regardless of the angular position which the flange must take because of the position of the screw holes in the machine, the connector portion 16 may assume an annular position in which it is free of torsional strains.

To connect the end of the connector portion 16 to the orifice of the machine in leak-proof engagement therewith, the portion 16 has a flat end 35 which engages a gasket 36 located in a cavity 37 in the machine.

When the flange is tightened into position on the machine, the connector 16 having taken a position in which there is no torsion on the hose, the end of the connector is pressed tightly against the gasket 36 and a continuous leak-proof connection is provided to and from the orifice of the machine from the interior of the hose and connector.

It should be understood that in some installations the machine part to which the flange 27 is fastened may be an integral part of the casting of the machine while in other instances it may comprise a flange having a nipple threaded into a hole in the machine, but in either case the flange 29 may be rotated on the connector to align its holes with the holes in the machine part.

Variations and modifications may be made within the scope of this invention and portions of the improvements may be used without others.

I claim:

1. A coupling for attaching a flexible metal hose over the orifice of a machine comprising a connector having portions adapted to be screwed together for clamping the same to the end of the hose and having an end portion for abutting engagement with a seat on the machine; an attaching member having holes to receive screws entering threaded holes provided in the machine and adapted to draw said end portion against the seat of the machine over the orifice therein in leak-proof engagement with the seat; and a swivel connection between the attaching member and the connector whereby torsional strains in the hose may be relieved by rotation of the connector and hose while the attaching member is attached to and before it is tightened against the machine.

2. A coupling for attaching a flexible metal hose over the orifice of a machine comprising a connector having portions adapted to be screwed together for clamping the same to the end of the hose and having an end portion for abutting engagement with a seat on the machine; an attaching member having holes to receive screws entering threaded holes provided in the machine and adapted to draw said end portion against the seat on the machine in leak-proof engagement therewith; and a swivel connection comprising a bearing in the attaching member in which the connector is rotatably mounted whereby torsional strains in the hose may be relieved by rotation of the connector and hose while the flange is attached to and before it is tightened against the machine.

3. A coupling for attaching a flexible metal hose over the orifice of a machine comprising a connector having portions adapted to be screwed together for clamping the same to the end of the hose and having a machine engaging portion, an attaching flange having wings each having a hole to receive a screw entering a threaded hole provided in the machine, said screws being adapted to draw the machine engaging portion against the machine over the orifice therein in leak-proof engagement therewith; and a swivel connection between the attaching flange and the connector whereby torsional strains in the hose may be relieved by rotation of the connector portion while the flange is attached to and before it is tightened against the machine.

4. A flexible fluid-conducting connection for use between two machine parts comprising a connector attachable to the first of the machine parts against rotating from an unpredetermined position; a flexible metal hose having its end fixed against rotation relative to said connector; a second connector having screw-threaded portions adapted to be screwed together for clamping the same to the other end of the hose and fixed against rotation relative thereto; an attaching member having holes to receive screws entering predeterminedly located threaded holes in the second machine part and adapted to draw the second connector into leak-proof engagement with the second machine part; and a swivel connection between the attaching member and the second connector whereby the latter and the hose may rotate in the attaching member to a position in which the hose is relieved of torsional strains which might be caused by the position in which the first connector happens to be fixed in the first machine part.

5. A flexible fluid-conducting connection for use between machine parts comprising a connector attachable to the first of the machine parts against rotating from an unpredetermined position; a flexible metal hose having its end fixed against rotation relative to said connector; a second connector located at the other end of the hose and attachable to and detachable from the hose; an attaching flange having wings provided with holes to receive screws entering predeterminedly located threaded holes in the second machine part and adapted to draw the second connector into leak-proof engagement with the second machine part; and a swivel connection between the attaching flange and the second connector whereby the latter and the hose may rotate in the attaching flange to a position in which the hose is relieved of torsional strains which might be caused by the position in which the first connector happens to be fixed in the first machine part.

6. A solderless flexible fluid-conducting connector for use between two machine parts comprising a connector having screw-threaded parts adapted to clamp and hold in leak-proof engagement the end of a flexible metal hose and a threaded nipple adapted to be screwed into a threaded hole in first of the machine parts to a greater or less extent until tightened therein; a flexible metal hose having its end fixed against rotation relative to said connector; a second connector having screw-threaded parts adapted to clamp and hold the other end of the hose fixed against rotation relative thereto and in leak-proof engagement therewith, said second connector having an end adapted to engage a seat on the second machine part; an attaching member having holes to receive screws entering predeterminedly located threaded holes in the second machine part and adapted to draw the end of the second connector into leak-proof engagement with the seat on the second machine part; and a swivel connection between the attaching member and the second connector whereby the latter and the hose may rotate in the attaching member to a position in which the hose is relieved of torsional strains which might be caused by the position in which the first connector happens to be tightened in the first machine part.

STEPHEN GUARNASCHELLI.

REFERENCES CITED

The following references are of record in the file of this patent:

UNITED STATES PATENTS

| Number | Name | Date |
|---|---|---|
| 826,931 | Gordon | July 24, 1906 |
| 2,363,586 | Guarnaschelli | Nov. 28, 1944 |
| 2,415,472 | Dorman | Feb. 11, 1947 |
| 2,422,597 | Stewart | June 17, 1947 |